United States Patent Office 2,736,748
Patented Feb. 28, 1956

2,736,748
N-(2'-NAPHTHYL) AMIDINOALKANES

Gordon Keith Maliphant, Peter Oxley and Douglas Archibald Peak, Nottingham, England, assignors to Boots Pure Drug Company Limited, Nottingham, England, a British company No Drawing. Application September 10, 1951,
Serial No. 245,963

Claims priority, application Great Britain
September 11, 1950

3 Claims. (Cl. 260—564)

This invention is concerned with new and useful chemical compounds.

The compounds of the present invention are N-(2'-naphthyl)amidinoalkanes of the general formula

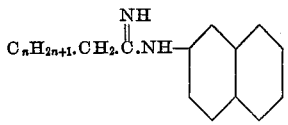

in which $n$ is an integer, and salts thereof. We have found these compounds to have properties which render them valuable in the field of medicine. They have the property of causing dilation of the coronary vessels.

The compounds of the present invention are conveniently prepared from the corresponding cyanoalkanes or derivatives thereof. For example the cyanoalkane may be heated with a 2-naphthylamine salt of an alkyl-, aralkyl- or aryl-sulphonic acid, according to the method claimed in British Patent No. 573,266; the sulphonic acid salt of the required N-(2'-naphthyl)amidinoalkane resulting may be converted into the free amidine or into other salts by methods known per se.

The following examples are illustrative and show methods of preparation of some of the compounds according to the invention.

Example I

In the preparation of N-(2'-naphthyl)-1-amidinoheptane, a mixture of 8 g. of n-heptylcyanide and 20.3 g. of 2-naphthylamine toluene-p-sulphonate is heated at a temperature of 190° C. for 3 hours. The cooled melt is dissolved in alcohol, the solution is decolourised with charcoal, filtered and the filtrate is diluted with an equal volume of water. The precipitate so formed is purified by dissolving in alcohol and re-precipitating by adding water. There is thus obtained N-(2'-naphthyl)-1-amidinoheptane toluene-p-sulphonate, having a melting point of 151° C. (Found: N, 6.25; $C_{25}H_{32}O_3N_2S$ requires N, 6.4.) In order to prepare the free amidine the toluene-p-sulphonate salt is suspended in water, the suspension is made alkaline by addition to 5N sodium hydroxide and the mixture is extracted with chloroform. The chloroform solution is dried over anhydrous sodium sulphate, the chloroform is evaporated, the residue is dissolved in light petroleum and the solution so obtained is mixed with ether. N-(2'-naphthyl)-1-amidinoheptane separates in the form of crystals having a melting point of 61° C. (Found: N, 10.45; $C_{18}H_{24}N_2$ requires N, 10.4.)

In like manner are prepared the following compounds:

N-(2'-naphthyl)-1-amidinoethane, M. P. 79–80° C.
N-(2'-naphthyl)-1-amidinopropane, M. P. 64–66° C.
N-(2'-naphthyl)-1-amidinobutane, M. P. 62–64° C.
N-(2'-naphthyl)-1-amidinopentane, M. P. 72–74° C.
N-(2'-naphthyl)-1-amidinohexane, M. P. 59° C.
N-(2'-naphthyl)-1-amidinooctane, M. P. 74° C.
N-(2'-naphthyl)-1-amidinononane, M. P. 75° C.

Example II

In the preparation of N-(2'-naphthyl)-1-amidinononane, a mixture of 5.1 g. of decoic nitrile and 10.5 g. of 2-naphthylamine toluene-p-sulphonate is heated at 200° C. for 3½ hours. The cooled melt is recrystallised from isopropanol. There is thus obtained N-(2'-naphthyl)-1-amidinononane toluene-p-sulphonate in the form of a colourless crystalline solid which has a melting point of 158° C. (Found N, 6.05; $C_{27}H_{36}O_3N_2S$ requires N, 5.98.) In the preparation of the free amidine, 6 g. of the toluene-p-sulphonate is dissolved in 12 cc. of methanol and the solution is treated with 6 cc. of 5N sodium hydroxide solution. The oil which separates is extracted with benzene, the benzene solution is dried over anhydrous potassium carbonate and the benzene is evaporated. The residual solid is crystallised from petroleum ether. There is thus obtained N-(2'-naphthyl)-1-amidinononane in the form of a colourless crystalline compound which has a melting point of 75° C. (Found: N, 9.7: $C_{20}H_{28}N_2$ requires N, 9.46.) If this compound is heated above its melting point and is allowed to cool a different crystalline form is obtained which has a melting point of 59° C.

We claim:

1. An N-(2'-naphthyl) amidinoalkane selected from the group consisting of

N-(2'-naphthyl)-1-amidinoethane
N-(2'-naphthyl)-1-amidinopropane
N-(2'-naphthyl)-1-amidinobutane
N-(2'-naphthyl)-1-amidinopentane
N-(2'-naphthyl)-1-amidinohexane.
N-(2'-naphthyl)-1-amidinoheptane
N-(2'-naphthyl)-1-amidinooctane
N-(2'-naphthyl)-1-amidinononane.

2. N-(2'-naphthyl)-1-amidinoheptane.
3. N-(2'-naphthyl)-1-amidinononane.

References Cited in the file of this patent

UNITED STATES PATENTS

| | | |
|---|---|---|
| 2,433,489 | Short et al. | Dec. 30, 1947 |
| 2,451,779 | Short et al. | Oct. 19, 1948 |

OTHER REFERENCES

Cymerman et al.: "J. Chem. Soc." (London), 1949, pp. 703–07.

Wiselogle: "Survey of Antimalarial Drugs 1941–1945," vol. II, Part I (1946), p. 642.

Charlton et al.: "J. Chem. Soc.," 1951 (London), pp. 485–92.